(No Model.) 2 Sheets—Sheet 1.
W. VANDERMAN.
COUPLING FOR WATER CLOSETS.
No. 529,146. Patented Nov. 13, 1894.
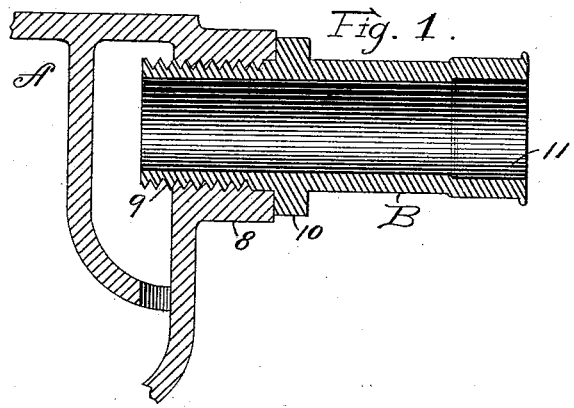
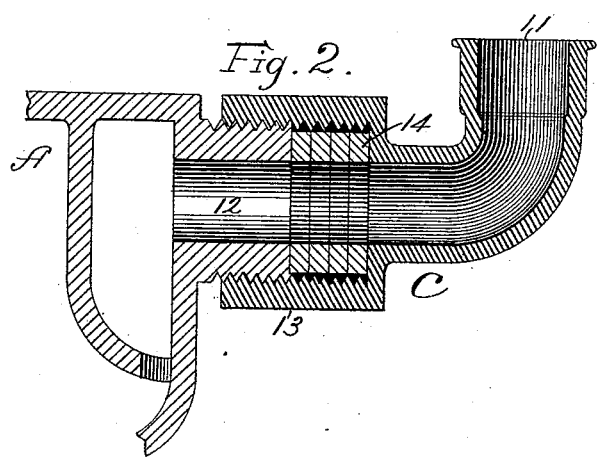
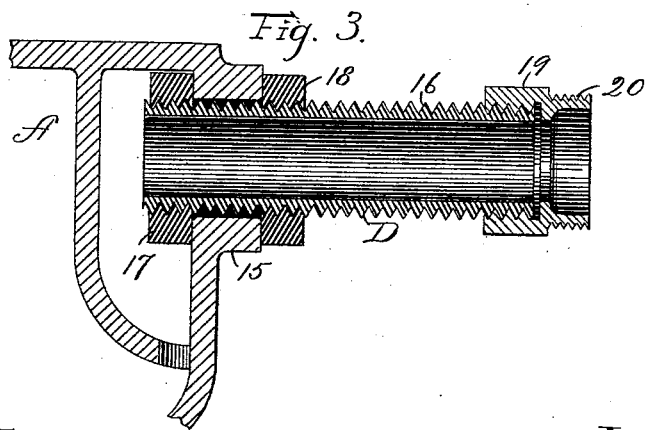
Witnesses
Inventor
William Vanderman
By James Shepard
Atty.

(No Model.) 2 Sheets—Sheet 2.
W. VANDERMAN.
COUPLING FOR WATER CLOSETS.
No. 529,146. Patented Nov. 13, 1894.
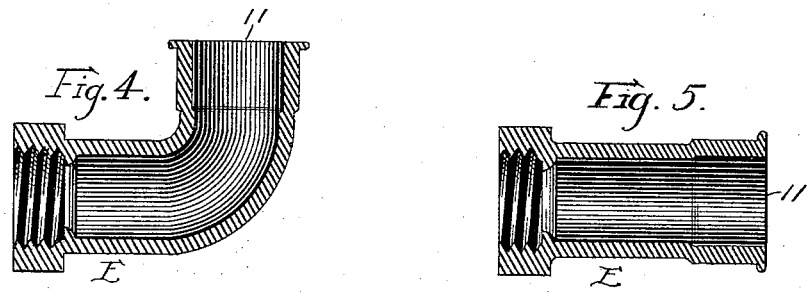
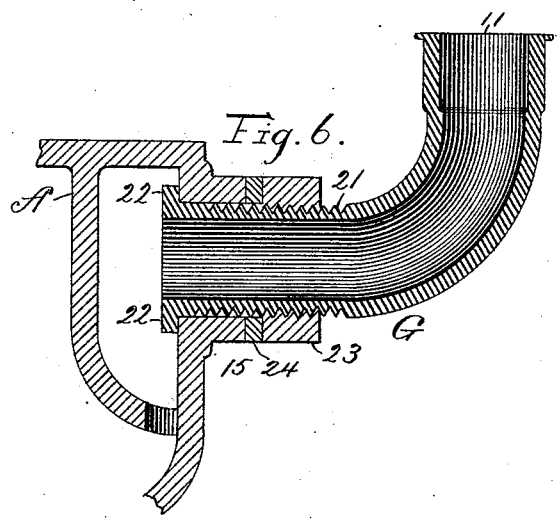
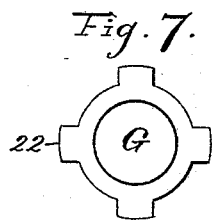
Witnesses
Inventor
William Vanderman
By James Shepard
Atty.

UNITED STATES PATENT OFFICE.

WILLIAM VANDERMAN, OF WILLIMANTIC, CONNECTICUT.

COUPLING FOR WATER-CLOSETS.

SPECIFICATION forming part of Letters Patent No. 529,146, dated November 13, 1894.

Application filed May 19, 1894. Serial No. 511,806. (No model.)

*To all whom it may concern:*

Be it known that I, WILLIAM VANDERMAN, a citizen of the United States, residing at Willimantic, in the county of Windham and State of Connecticut, have invented certain new and useful Improvements in Couplings for Water-Closets, of which the following is a specification.

My invention relates to improvements in couplings for water closets, and the objects of my improvement are simplicity and efficiency, and to provide a flexible connection that is readily adapted for use with either old or new work.

In the accompanying drawings: Figure 1 is a central vertical section of my coupling, together with so much of a water closet bowl as is necessary to show its connection. Fig. 2 is a like view of the same in a somewhat modified form. Fig. 3 is a like view showing still another modification. Figs. 4 and 5 are central longitudinal sections of the flexible connection pipe in two different forms. Fig. 6 is a view corresponding with Figs. 1, 2, and 3 but showing another modification, and Fig. 7 is an end view of the inner end of the flexible connection.

A designates a portion of a water closet bowl, and in Fig. 1, 8 designates the inlet thereto which is usually termed the horn, and which in this case is provided with a coarse internal thread, as shown, said thread to be molded integral with the horn and bowl, and therefore, this construction is particularly designed for new work.

B designates the pipe connection made of rubber or equivalent elastic material and provided at its inner ends with screw threads 9 which are adapted to fit and fill the threads in the horn 8. I also provide said connection with a flange 10 which is designed to seat itself firmly against the outer end of the horn, as shown.

I have shown the elastic connection B as a straight piece, but it is of course evident that its outer end might be curved to form an elbow if desired. The outer end of this connection is somewhat enlarged and left smooth to form a socket 11 to receive the end of the supply pipe which may be forced into said socket by stretching said socket over said pipe and the elasticity of the material will make the connection tight without the addition of other means, but paint or cement may be applied at this point, or in fact, at any point desired in any of the couplings which I describe. With this coupling it is only necessary to screw the flexible piece into the horn of the bowl with its flange firmly up against the outer end of a horn, thereby making a tight connection in a very simple manner without any necessity for the use of washers or other packing.

In Fig. 2, I have shown what may be called the reverse of the construction shown in Fig. 1 and in which the horn 12 is exteriorly threaded while the flexible connection C is provided with an enlargement 13 at its inner end, and internal threads to fit over the horn 12. In this construction one or more washers 14 may if desired be inserted between the end of the horn and the junction of the enlargement with the body of the connection C, thereby enabling the connection to project a greater or less distance from the bowl by omitting some of said washers, and if necessary cutting off the inner end of the connection. While I have shown the outer end of this flexible connection in the form of an elbow, it is evident that it may if desired be left straight as shown in Fig. 1.

In Fig. 3, I have shown the bowl A as provided with a short horn 15 having a smooth interior, the same being such a horn as might be found upon an old bowl after the outer end of the horn had been broken off, the construction illustrated in this figure being more particularly adapted for applying the flexible connection to an old closet, although it is adapted for new work.

D designates the flexible connection which I have provided with an exterior thread 16 for its whole length. 17 designates an elastic nut which is correspondingly threaded and which may be inserted through the horn 15 by compressing it, after which the flexible connecting pipe D may be screwed into it, as shown. I also place upon the body of said connection a nut or coupling ring 18 which is interiorly threaded and which may be of metal or rubber as may be desired. This is screwed up against the outer end of the horn, as shown in Fig. 3, thereby making the connection perfect so far as connecting with the bowl is concerned. The outer end of this flexible connection D may have any of the forms herein shown or any other desired form, but I have shown it as threaded to its outer end and supplied with a coupling 19 screwed thereon, which coupling is provided with a threaded nib or connection 20 to receive the supply pipe or an elbow on the same. This flexible connection D may be cut off to make it longer or shorter as may be desired, and in lieu of the coupling 19 it may receive a flexible elbow connection E, shown in Fig. 4, or a straight flexible connection F which is shown in Fig. 5, either of said connections being screwed upon the outer threaded end of the flexible connection D.

In Fig. 6, the horn 15 is provided with a smooth opening, whereby this coupling is adapted for either old or new work.

G designates the flexible connection which is provided with external screw threads, as at 21, while on its inner end I provide a holding flange 22 which, if desired, may be in one continuous circle or divided up into sections, as shown in Fig. 7. The inner end of this flexible connection G is compressed to force it through the hole in the horn 15 when the holding flange 22 will spread out and be seated upon the seat surrounding the orifice in the horn when the pipe is pulled back, as shown in Fig. 6. I also provide this flexible connection with a nut 23 on its threaded portion and if desired with a washer 24, said parts being put in place by forcing either end of the flexible connection through them. The connection is tightened by tightening up the nut 23 as shown in Fig. 6. While I have shown this connection G in the form of an elbow, it is evident that the portion which is connected with the bowl would not be changed, either in construction or mode of operation, if its outer end were of a different form, as for example, any of the forms shown in the preceding figures.

Instead of the elbow made integral with the threaded portion and its connections the elbow may be cut off or omitted and either of the connections shown in Figs. 4 and 5 screwed upon the outer end of its threaded portion or said outer end may have the coupling 19 screwed upon it.

While I have with the exception of Fig. 3 shown what I may term the plain socket 11 for connecting the supply pipe to the flexible connection, it is evident that any other form of connection with the supply pipe may be employed without in any way changing the construction of the flexible connection with the bowl. By the employment of an elastic screw thread on the connection I greatly simplify the construction, lessen the expense of fitting and insure a tight joint with less trouble in packing. By the employment of an internal holding flexible flange, I adapt the connection to be applied to old as well as new work.

I claim as my invention—

1. The combination of the horn of the bowl having an outer and inner seat, and the flexible connecting pipe having elastic threads, the inner holding flange upon the inside of the horn, and a nut on the threaded portion for screwing up against the outer side of the horn, substantially as described and for the purpose specified.

2. In a coupling for water closets, the combination of the horn of the bowl, with a flexible connection having an elastic flange for resting against one end of said horn and elastic screw threads for holding said flange in engagement, substantially as described and for the purpose specified.

WILLIAM VANDERMAN.

Witnesses:
SILAS F. LOOMER,
ASABEL O. WRIGHT.